United States Patent
Bressand et al.

(10) Patent No.: US 8,102,587 B2
(45) Date of Patent: Jan. 24, 2012

(54) ELECTROCHROMIC DEVICE HAVING CONTROLLED INFRARED REFLECTION

(75) Inventors: Emily Bressand, Paris (FR); Jean-Christophe Giron, Eupen (BE); Bastien Royer, Remagen (DE); Emmanuel Valentin, Le Plessis Trevise (FR); Samuel Dubrenat, Paris (FR)

(73) Assignee: Saint-Gobain Glass France, Courbevoie (FR)

( * ) Notice: Subject to any disclaimer, the term of this patent is extended or adjusted under 35 U.S.C. 154(b) by 0 days.

(21) Appl. No.: 13/054,089

(22) PCT Filed: Jul. 10, 2009

(86) PCT No.: PCT/FR2009/051392
§ 371 (c)(1),
(2), (4) Date: Apr. 14, 2011

(87) PCT Pub. No.: WO2010/007303
PCT Pub. Date: Jan. 21, 2010

(65) Prior Publication Data
US 2011/0181939 A1    Jul. 28, 2011

(30) Foreign Application Priority Data

Jul. 17, 2008   (FR) ..................... 08 54865

(51) Int. Cl.
G02F 1/153    (2006.01)
G02F 1/03     (2006.01)
(52) U.S. Cl. ................. 359/270; 359/242; 359/275
(58) Field of Classification Search .......... 359/265–277, 359/245–250, 242, 259, 315–316, 237, 263, 359/252–254, 318; 345/49, 105; 250/70; 438/929; 249/24, 113
See application file for complete search history.

(56) References Cited

U.S. PATENT DOCUMENTS

| | | | |
|---|---|---|---|
| 5,581,406 A * | 12/1996 | Kobayashi et al. | 359/604 |
| 6,747,779 B1 | 6/2004 | Morin et al. | |
| 2004/0021927 A1 | 2/2004 | Milne et al. | |
| 2005/0248824 A1* | 11/2005 | Fukazawa et al. | 359/265 |
| 2006/0033978 A1* | 2/2006 | Morin et al. | 359/265 |

OTHER PUBLICATIONS

Hale, J. et al., "Prospects for IR Emissivity Control Using Electrochromic Structures", Thin Solid Films, vol. 339, No. 1-2, pp. 174-180 (Feb. 8, 1999) XP-002512863.
International Search Report Issued Dec. 17, 2009 in PCT/FR09/051392 filed Jul. 10, 2009.

* cited by examiner

*Primary Examiner* — Dawayne Pinkney
(74) *Attorney, Agent, or Firm* — Oblon, Spivak, McClelland, Maier & Neustadt, L.L.P.

(57) ABSTRACT

The present invention relates to an electrochromic device having controlled infrared reflection, in particular of the electrically controllable type, comprising, between a carrier substrate (1*a*) transparent in the infrared range and a counter-substrate (1*b*), a multilayer stack.

The device is characterized in that this multilayer stack comprises, in succession:
a) a metal grid (3) transparent in the infrared range, forming a first electrode;
b) an electrochromic functional system (5) comprising a layer (EC1) of an ion-storage first electrochromic material, at least one layer (EL1, EL2) having an electrolytic function, and a layer (EC2) of a second electrochromic material;
c) a metal layer (7) capable of reflecting the infrared radiation, forming a second electrode; and
d) a lamination interlayer (9) made of a thermoplastic polymer.

11 Claims, 1 Drawing Sheet

ELECTROCHROMIC DEVICE HAVING CONTROLLED INFRARED REFLECTION

This application is a U.S. National Stage Application of PCT/FR2009/051392, filed on Jul. 10, 2009, the text of which is incorporated by reference, and claims priority to French Application No. 0854865, filed on Jul. 17, 2008, the text of which is also incorporated by reference.

The present invention relates to an electrochromic device having controlled infrared reflection, in particular intended to form an electrically controllable panel, especially glazing.

Glazing with the capacity to reflect light in the infrared range is known. Such glazing has found applications in a very diverse range of technical fields.

Thus, in particular, the glazing may be used as windows for a dwelling so as, for example, to ensure that various rooms of a building are thermally regulated according to their respective exposure to solar radiation.

Of course, the glazing may be used in other fields, such as in particular the aeronautical field, for example to control and regulate the infrared radiation entering via the various windows of an aircraft.

It is known that electrochromic devices comprise a layer of an electrochromic material capable of inserting, reversibly and simultaneously, ions and electrons, the oxidation states of which, corresponding to the inserted and ejected states, have a distinct color when they are supplied via a suitable power supply, one of these states having a higher light transmission than the other. The electrochromic material is generally based on tungsten oxide and must be brought into contact with an electron source, such as for example a transparent electroconductive layer, and with an ion (cation or anion) source such as an ionically conductive electrolyte. It is known that a counter-electrode, also capable of reversibly inserting cations, must be associated with the layer of electrochromic material, symmetrically with respect to said layer, so that, macroscopically, the electrolyte appears as a single ion medium. The counter-electrode must be based on a layer which is neutral in color or, at least, transparent or barely colored when the electrochromic layer is in the colored state.

Since tungsten oxide is a cathodic electrochromic material, i.e. its colored state corresponds to the most reduced state, an anodic electrochromic material based on nickel oxide or iridium oxide is generally used for the counter-electrode. It has also been proposed to use a material which is optically neutral in the oxidation states in question, such as, for example, cerium oxide or organic materials such as electronically conductive polymers (polyaniline) or Prussian blue.

At the present time, electrochromic systems may be put into two categories depending on the electrolyte used.

In the first category, the electrolyte may thus take the form of a polymer or a gel, such as for example a proton-conductive polymer, such as those described in European patents EP 0 253 713 and EP 0 670 346, or a polymer conducting by lithium ions, such as those described in the patents EP 0 382 623, EP 0 518 754 and EP 0 532 408.

In the second category, the electrolyte may also be based on a mineral layer forming an ion conductor which is electrically isolated. These electrochromic systems are then referred to as "all solid-state" systems. The reader may refer to European patents EP 0 867 752 and EP 0 831 360.

Other types of electrochromic systems are known, such as in particular what are called "all polymer" electrochromic systems, in which two electroconductive layers are placed on either side of a multilayer stack comprising a cathodic-coloration polymer, an ion-conductive electronically insulating polymer (most particularly for $H^+$ or $Li^+$ ions) and finally an anodic-coloration polymer (such as polyaniline or polypyrrole).

Finally, systems called "active" systems are known within the meaning of the invention, which combine viologen materials and electrochromic materials, for example having the sequence: Conductive electrode/mineral layer or polymer having electrochromic properties/layers (liquid, gel or polymer) having viologen/conductive electrode properties.

These systems based on reversible insertion materials are particularly advantageous as they make it possible to modulate the absorption in a broader wavelength range than viologen systems: they may absorb variably not only in the visible but also, in particular, in the infrared, which may give them an effective optical and/or thermal role.

These various systems comprise two electroconductive layers which sandwich one or more electrochemically active layers. Now, when a potential difference is created between these two electroconductive layers, the transmission/absorption state of the system, in other words the level of transparency thereof, is controlled by the value of this potential difference.

When the system forms glazing which one wishes to be "electrically controllable", preference is given, of course, to the transparency of these electroconductive layers, so that they have to made from materials that are both electrically conductive and transparent within thickness ranges usually encountered in the thin-film field.

Usually a doped metal oxide material is employed, such as fluorine-doped tin oxide ($SnO_2$:F) or tin-doped indium oxide (ITO), which may be thermally deposited on various substrates, in particular by pyrolysis, on glass, such as the technique referred to as CVD, or cold deposition in particular using sputtering vacuum techniques.

However, it has been found that, for thicknesses in which they remain transparent, the layers based on these materials are not entirely satisfactory insofar as they are not sufficiently conductive, so that, when an appropriate electrical voltage is applied across the terminals of the system in order to cause the necessary change of state, the response time, or switching time, of the system is increased, with an inhomogeneous change of state of large surfaces.

More precisely, in the case for example in which the two electroconductive layers are based on tin-doped indium oxide (ITO), the resistivity of the base layer, or bottom layer, which is around 3 to 5 $\Omega/\square$, increases to 60-70 $\Omega/\square$ in the case of the top layer because of its small thickness. Specifically, it is known that if the base layer has a thickness of around 500 nm, the top layer itself has only a thickness of around 100 nm, for reasons essentially due to the mechanical strain generated in the multilayer stack.

It is this difference in resistivity between the top and bottom layers which causes the switching time of the device, i.e. the time needed for the system to switch from its most transparent state to its most opaque state, to be slower.

It will be understood that, in most applications and in particular in the architectural and automotive glazing sectors, whether it be electrochromic glazing with controlled transparency or with controlled reflection, the user finds it very difficult to accept such defects as he wishes to have as rapid and as uniform a change as possible.

Moreover, in many applications, in particular in the cases in which the system an infrared system having electrically controlled reflection, it is essential to protect the system against any external attack to which it is exposed during its use, such as in particular environmental attack, such as foul weather, or mechanical attack, such as shocks or scratches.

The aim of the present invention is to remedy these various drawbacks by proposing a device having electrically controllable infrared reflection possessing rapid switching times, around one tenth of those of the prior art, which has, between its colored state and its bleached state, a substantial difference in reflection and which, in addition, is protected from various types of external attack to which there is a risk of it being exposed during its use.

Thus, one subject of the present invention is an electrochromic device, having controlled infrared reflection, in particular of the electrically controllable type, comprising, between a carrier substrate transparent in the infrared range and a counter-substrate, a multilayer stack, characterized in that this multilayer stack comprises, in succession:
- a) a metal grid transparent in the infrared range, forming a first electrode;
- b) an electrochromic functional system comprising a layer of an ion-storage first electrochromic material, at least one layer having an electrolytic function, and a layer of a second electrochromic material;
- c) a metal layer capable of reflecting the infrared radiation, forming a second electrode; and
- d) a lamination interlayer made of a thermoplastic polymer.

Preferably, the substrate will be based on sapphire and the counter-substrate will in particular be based on glass. Moreover, the ion-storage layer will preferably be based on iridium oxide.

The metal grid, which may be of the monolayer or multilayer type, may be based on aluminum and/or platinum and/or palladium and/or copper and/or preferably gold and/or based on an alloy of these metals, and/or based on titanium nitride.

In one embodiment of the invention, the layer having an electrolytic function will be of the bilayer type and will in particular be based on tantalum oxide or tungsten oxide.

The lamination interlayer may be based on polyvinyl butyral (PVB) or on ethylene vinyl/acetate or preferably on polyurethane (PU). This lamination interlayer may ensure that the connection elements bringing the current to the electrodes are supported.

Another subject of the present invention is a panel having controlled energy dissipation employing a device according to one of the abovementioned features.

According to another aspect, the subject of the invention is the use of a panel as described above as architectural glazing, automotive glazing, glazing for industrial vehicles or for rail, sea and air public vehicles, agricultural vehicles, building site machines, rear-view and other mirrors, displays and shutters for image acquisition devices.

One embodiment of the present invention will be described hereinbelow, by way of nonlimiting example, with reference to the appended drawing in which:

FIG. 1 shows an electrochromic device having controlled infrared reflection according to the invention, which is in particular intended to be applied for producing windows of a room for which it is desirable to regulate the incoming heat flux so as to take into account the specific exposure of each window to solar radiation.

Figure 1:
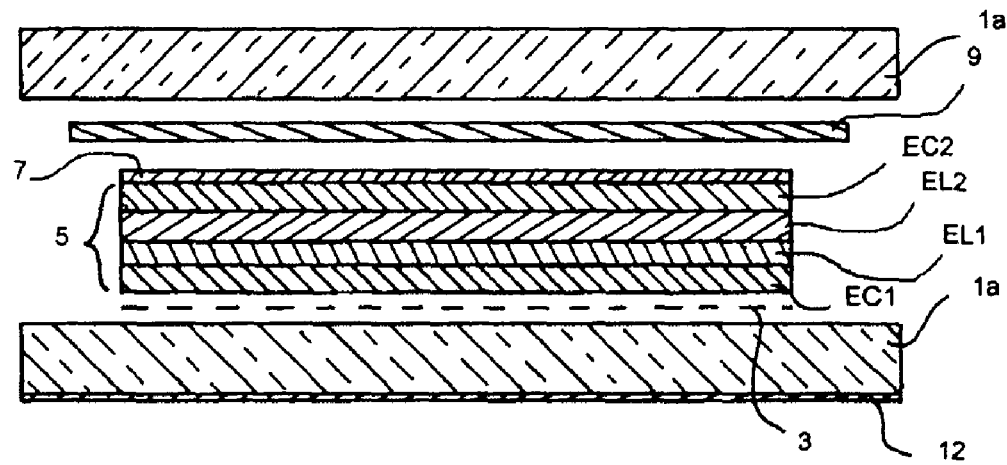
FIG. 1 is view in vertical cross section of an electrochromic device having controlled infrared reflection according to the invention.

In general, such a device is formed from a multilayer stack comprising, between a carrier substrate 1a and a counter-substrate 1b, a metal grid 3 transparent in the infrared range, an electrochromic functional system 5, a metal layer 7 capable of reflecting the infrared, and a thermoplastic polymer sheet 9 intended for laminating the device.

More precisely, this device thus comprises:
- A) the carrier substrate 1a transparent in the infrared range, within a wavelength range between 1 and 30 µm, said substrate being in particular based on sapphire, but it could also be formed from silicon, germanium, zinc sulfide, zinc selenide, cadmium telluride (CdTe), calcium fluoride, barium fluoride, magnesium fluoride, glass transparent to infrared, or polyethylene;
- B) the metal grid 3, preferably made of gold, but it could also be made in particular of aluminum, platinum, palladium or copper. This grid may also be based on a metal alloy or may be of the multilayer type, depending on the infrared spectral range in question. This metal grid will also provide the device with a current supply function; and
- C) the electrochromic functional system 5, itself based on two extreme electrochromic electroactive layers EC1 and EC2 between which one or more layers $EL_n$ having an electrolytic function are placed.

The layers EC1 and EC2 comprise at least one of the following compounds, used alone or as a mixture: tungsten oxide, niobium oxide, tin oxide, bismuth oxide, vanadium oxide, nickel oxide, iridium oxide, antimony oxide, tantalum oxide, and/or an additional metal, such as titanium, rhenium or cobalt, and the layer EL having an electrolytic function, which may in fact be formed by combining at least one layer based on a material chosen from tantalum oxide, tungsten oxide, molybdenum oxide, antimony oxide, niobium oxide, chromium oxide, cobalt oxide, titanium oxide, tin oxide, nickel oxide and zinc oxide, optionally alloyed with aluminum, zirconium, aluminum or silicon, optionally alloyed with aluminum or silicon nitride, optionally alloyed with aluminum or boron, boron nitride, aluminum nitride or vanadium oxide, optionally alloyed with aluminum or tin zinc oxide, at least one of these oxides being optionally hydrogenated or nitrided.

In the present embodiment of the invention, the electrochromic functional system 5 thus comprises:
- a first layer EC1 of an anodic electrochromic material, made of hydrated iridium oxide $IrO_xH_y$, with a thickness of 70 nm;
- a tungsten oxide $WO_3$ first layer EL1 having an electrolytic function, with a thickness of 100 nm;
- a hydrated tantalum second layer EL2 having an electrolytic function, with a thickness of 100 nm; and
- a second layer EC2 of a cathodic electrochromic material based on tungsten oxide $H_xWO_3$, with a thickness of 380 nm;
- D) the metal layer 7 capable of reflecting the infrared will be optimized within the working spectral range of the device. This metal layer, which will in particular be based on gold, could thus also be based on highly conductive metal oxides such as zinc oxide doped with aluminum or with fluorine, with $SnO_2$—ZnO, with aluminum, with platinum, with palladium or with copper. This metal layer provides, according to the invention, two functions, namely an infrared radiation reflection function and a current supply function for the electrochromic layer; and
- E) the thermoplastic polymer sheet 9 is intended for laminating the device for the purpose of obtaining laminated glazing. Preferably, it may be a sheet of polyurethane (PU) but it may also be based on polyvinyl butyral (PVB) or ethylene vinyl/acetate (EVA). This polymer sheet may advantageously fulfill a support function for the connection elements that supply the electrochromic layers EC1 and EC2 with current. Optionally, the external face of the substrate 1a will be coated with an anti-reflection layer 12.

According to the present invention, the electrochromic functional system 5 may of course be configured in various ways, depending on the result that the device is intended to provide.

Figure 2:
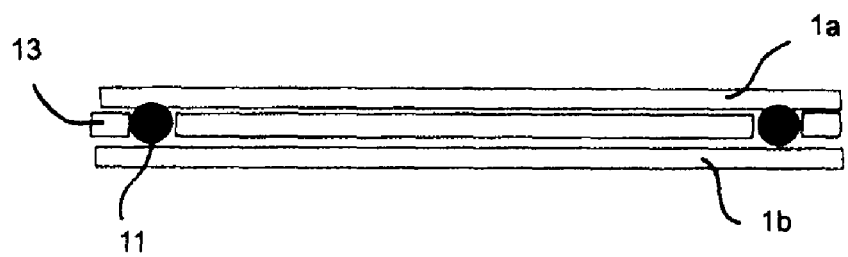
FIG. 2 is a schematic view in vertical cross section of an example of means intended for sealing the device.

As shown in FIG. 2, the device according to the invention is provided with means capable of sealing it, both from the outside and the inside, and thus comprises a first peripheral seal 11 in contact with the internal faces of the two substrates 1a and 1b, which is designed to act as a barrier to external chemical attack and as a barrier to water in the form of vapor.

The device also includes a second peripheral seal 13, which is also in contact with the internal faces of the two substrates 1a and 1b and is positioned on the periphery of the first seal 11. It forms a barrier impermeable to liquid water and provides a means of mechanically reinforcing the peripheral groove, preventing the thin substrates from breaking during lamination or during successive handling operations.

The present invention is particularly advantageous as it dispenses with the use of TCOs, namely transparent conductive oxides, used to supply the electrochromic layers with current, which oxides are the cause of the low switching speed of the usual electrochromic devices.

Measurements carried out on glazing according to the present invention have thus enabled switching times of the order of one second to be obtained for glazing with an area of 3×3 cm$^2$, 7 s for an area of 30×30 cm$^2$ and 50 s for an area of 1 m$^2$.

Figure 3:
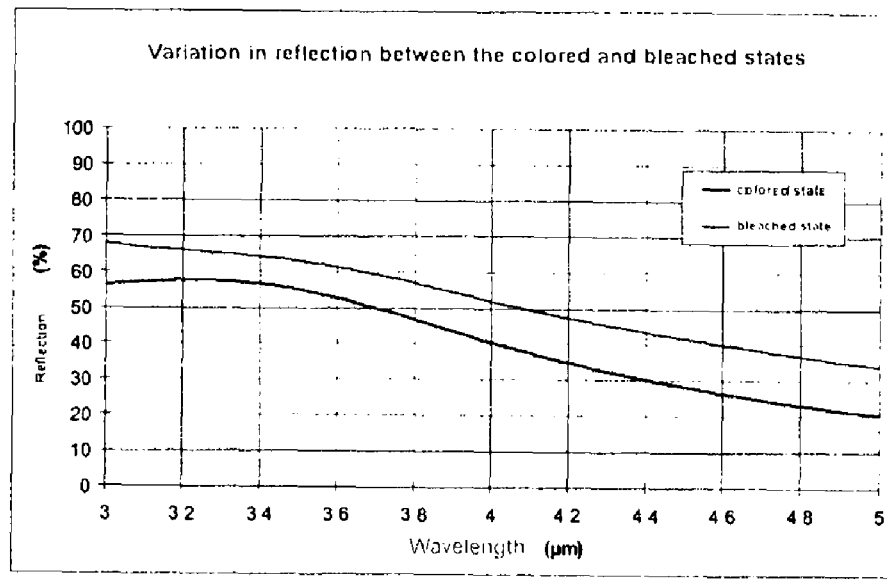
FIG. 3 is a curve showing the variation in the reflection of an electrochromic device according to the invention between the colored state and the bleached state for illumination varying in wavelength between 3 µm and 5 µm.

Moreover, as shown in FIG. 3, the variation in reflection between the colored and bleached states of the electrochromic device having controlled infrared reflection according to the invention is effective since, for infrared radiation with a wavelength between 3 nm and 5 nm, it is around 15%.

The invention claimed is:

1. An electrochromic device comprising, between a carrier substrate transparent in the infrared range and a counter-substrate, a multilayer stack, wherein the multilayer stack comprises, in succession:
   a) a metal grid transparent in the infrared range, forming a first electrode;
   b) an electrochromic functional system comprising a layer of an ion-storage first electrochromic material, at least one layer having an electrolytic function, and a layer of a second electrochromic material;
   c) a metal layer capable of reflecting the infrared radiation, forming a second electrode; and
   d) a lamination interlayer comprising a thermoplastic polymer, wherein
   e) the substrate and the counter-substrate comprise, sapphire or silicon or germanium or zinc sulfide or zinc selenide or cadmium telluride, or calcium fluoride, or barium fluoride or magnesium fluoride, or glass transparent to infrared, or polyethylene,
   wherein the electrochromic device has controlled infrared reflection.

2. The electrochromic device as claimed in claim 1, wherein the substrate comprises sapphire and the counter-substrate comprises glass.

3. The electrochromic device as claimed in claim 1, wherein the metal grid may be a monolayer or multilayer and may comprise aluminum and/or platinum and/or palladium and/or copper and/or gold and/or based on an alloy of these metals, and/or based on titanium nitride.

4. The electrochromic device as claimed in claim 1, wherein the ion-storage layer comprises iridium oxide.

5. The electrochromic device as claimed in claim 1, wherein the layer having an electrolytic function is a bilayer.

6. The electrochromic device as claimed in claim 5, wherein the electrolytic layer comprises tantalum oxide and tungsten oxide.

7. The electrochromic device as claimed in claim 1, wherein the lamination interlayer comprises polyvinyl butyral or ethylene vinyl/acetate, or polyurethane.

8. The electrochromic device as claimed in claim 1, wherein the lamination interlayer ensures that a connection element bringing the current to the electrodes is supported.

9. A panel having controlled energy dissipation, wherein it comprises a device as claimed in claim 1.

10. A panel as claimed in claim 9, further comprising glazing.

11. An architectural glazing, automotive glazing, glazing for industrial vehicles or for rail, sea and air public vehicles, agricultural vehicles, building site machines, rear-view and other mirrors, displays and shutters for image acquisition devices, comprising the panel of claim 9.

* * * * *